3,192,176
MIXTURE OF DIENE COPOLYMER AND
ACRYLONITRILE COPOLYMER
Karl-Heinz Mielke, Cologne-Stammheim, Heino Logemann, Leverkusen, Gustav Pieper, Cologne Stammheim, Willi Dünwald, Leverkusen, and Wilhelm Becker, Cologne-Stammheim, Germany, assignors to Farbenfabriken Bayer Aktiengesellschaft, Leverkusen, Germany, a corporation of Germany
No Drawing. Filed July 2, 1962, Ser. No. 207,030
Claims priority, application Germany, July 3, 1961,
F 34,322
7 Claims. (Cl. 260—29.7)

The present invention relates to mixtures of special copolymer-dispersions which are excellently suitable for preparation of coatings and films of high resistance to solvents and heat. More specifically this invention relates to specific copolymer dispersions which are suitable as stoving lacquers.

Aqueous dispersions of copolymers with a predominant proportion of acrylonitrile, for example copolymers of acrylonitrile with functional derivatives of acrylic or methacrylic acids, have already been used as stoving lacquers, by themselves or in combination with condensation products of formaldehyde and phenols, urea or melamine, since they produce coatings which are comparatively resistant to temperature. On the other hand, it is known to use dispersions of copolymers of butadiene or isoprene with styrene and similar vinyl monomers for painting purposes.

However, both types of dispersions have shown disadvantages in the respect that the mechanical properties of the coatings produced therewith, particularly under heat, and also the bonding strength with the support, are only moderate. In particular, the resisitivity to hot water or solvents, and especially to alcohol is very inadequate. The electrical properties are very dependent on temperature, and more especially the dielectric strength is reduced at relatively high temperatures to a fraction of the initial value.

It has already been proposed to use dispersions of ternary copolymers containing polymerisable acid amides or derivatives thereof as components for the production of coatings, more especially lacquers for wires, since such coatings show improved resistance to heat and pressure.

It has now been found to be possible, with the aid of aqueous polymer dispersions, to obtain coatings which can be cross-linked at relatively high temperatures and do not show the disadvantages set forth, if the dispersion of a special copolymer of acrylonitrile (A) is mixed with a second dispersion of another special copolymer (B) which contains carbon-carbon double bonds capable of cross-linking under heat and this mixture, after being applied to the support to be coated, is heated to temperatures above 100° C. At least one of the two copolymer dispersions must contain a copolymer in which monomers carrying hydrophilic groups are incorporated by copolymerisation.

Dispersions of said copolymer (A) of acrylonitrile which are suitable for the process of the present invention are those which have been obtained by copolymerising (i) 30 to 95% and advantageously 50 to 70% of acrylonitrile with (ii) 5 to 70% and advantageously 30 to 50% of at least one or more copolymerizable monomer containing one terminal $CH_2=C<$-group and (iii) 0.1 to 20% and advantageously 0.5 to 5% of a further copolymerisable monomer carrying at least one hydrophilic group (as defined below).

As copolymerisable monomers carrying at least one hydrophilic group more especially there are to be considered monomers which on the one hand contain a terminal $CH_2=C<$-group and on the other hand a hydrophilic function of the following group:

—COOH
—$CONH_2$
—CO—NH—$CH_2$—OH
—CO—NH—$CH_2$—O—$CH_3$

The following are more especially to be considered as polymerisable monomers containing one terminal $CH_2=C<$-group: styrene and its substitution products and homologues, more especially styrenes alkylated on the nucleus; esters of acrylic or methacrylic acids, more especially those with aliphatic or cycloaliphatic monohydric alcohols. Various monohydric alcohols are to be considered here as alcohol component for the aforementioned esters, for example aliphatic straight-chain or branched alcohols with 1 to 12 carbon atoms, such as methyl, ethyl, propyl, isopropyl alcohol, but especially the butyl alcohols. It is obvious that esters of other alcohols can additionally be employed.

If the esters of acrylic acid are wholly or partially replaced by the esters of methacrylic acid, correspondingly higher proportions are necessary for producing the same plasticiser effect, since the latter esters do not impart the necessary high elasticity to the film to be produced in the same way as the acrylic acid.

The following are also to be mentioned: alkyl, aryl or aralkyl amides of acrylic or methacrylic acids; vinyl ethers or vinyl esters, such as vinyl acetate, vinyl propionate, vinyl butyrate and the like.

At least one of the copolymer dispersions to be used according to the invention must constitute a copolymer which contains monomers carrying hydrophilic groups incorporated by polymerisation. As indicated above also both of the copolymer dispersions (A) and (B) may contain monomers carrying hydrophilic functions. Preferred in this connection are water-soluble monomers containing polymerisable terminal $CH_2=C<$-groups and carboxyl groups, carboxylic acid amide groups as well as methylol and alkoxy methyl derivatives of $\alpha,\beta$-olefinically unsaturated acid amides. More particularly to be considered as such amides are those of acrylic and methacrylic acids, but the use of other unsaturated acid amides such as those of fumaric, maleic and itaconic acids is not excluded. To be understood as derivatives of unsaturated acid amides within the scope of the present invention are N-methylol-compounds of acid amides, N-methylol ethers of acid amides, such as the methyl or ethyl-methylol ethers, and also mannich bases of such amides. The last-mentioned compounds can for example be obtained by the process disclosed in German patent specification Deutsche Auslegeschrift 1,102,157, by the said starting components, more especially acrylamide or methacrylamide, being reacted with formaldehyde and secondary amines. Suitable secondary amines are for example aliphatic amines, such as dimethylamine, diethylamine, and homologues, araliphatic amines, such as N-methylol-aniline, N-ethyl-aniline, dibenzyl-aniline, cycloaliphatic amines, such as N-methyl cyclohexylamine, heterocyclic amines, such as morpholine. In addition, it is also possible in principle for monomers carrying oxy-groups, amino-groups as well as similar hydrophilic groups, for example vinyl esters or allyl esters or methallyl esters of low oxy- or amino-carboxylic acids to be used as hydrophilic comonomers.

Dispersions of copolymers (B) which contain carbon-carbon double bonds capable of crosslinking under heat are those which have been obtained by copolymerising.

(i) 20 to 60% of an aliphatic conjugated diolefine having from 4 to 6 carbon atoms; and (ii) at least one further copolymerizable monomer containing one terminal $CH_2=C<$-group.

According to a preferred embodiment of this invention the latter monomer component (ii) containing one terminal $CH_2=C<$-group is substituted by 0.1 to 20% of a further copolymerizable monomer containing one terminal $CH_2=CH<$-group and carrying at least one hydrophilic group as defined in the foregoing. As examples for aliphatic conjugated diolefines having from 4 to 6 carbon atoms there are to be mentioned monomers such as butadiene-(1,3), isoprene as well as similar constituted 1,3-dienes.

Suitable copolymerizable monomers containing one terminal $CH_2=C<$-group may be the same as mentioned as copolymer components for the copolymer-dispersion (A).

Especially suitable are copolymers of 20 to 60% of a conjugated diolefine, such as butadiene or isoprene with one or more monovinyl compounds, such as acrylonitrile, styrene or esters of acrylic or methacrylic acid.

However, as components with double bonds capable of cross-linking under heat, it is also readily possible to use unsaturated polyesters of for example $\alpha,\beta$-unsaturated dicarboxylic acids and dihydric or polyhydric alcohols or polymers of unsaturated derivatives of ethylene oxide, for which purpose reference is to be made to polymers of butadiene oxide or polyglycide ethers of allyl phenols.

According to a special advantageous modification of the present process, the aqueous dispersion of the copolymer (B) containing carbon-carbon double bonds capable of cross-linking under heat can simultaneously contain, incorporated by polymerisation monomers carrying hydrophilic groups. Said monomers carrying hydrophilic groups represent polymerizable compounds having one terminal $CH_2=C<$-group and preferably one hydrophilic function such as —COOH, —CONH$_2$,

—CO—NH—CH$_2$OH or a —CO—NM—CH$_2$—O—CH$_3$ group. In principle the same components which are listed as hydrophilic groups containing monomers for the copolymer (A) are suitable.

Amounts of these hydrophilic monomers of 0.1 to 20% and advantageously 0.5 to 10% are of particular interest.

One particularly preferred embodiment of the present invention consists in the use of an acrylonitrile copolymer dispersion (A) which has been obtained by copolymerisation of 55 to 65% of acrylonitrile with 25 to 35% of styrene, 1 to 7% of methacrylic acid or acrylic acid and 1 to 7% of methacrylic acid amide or acrylic acid amide, blended with a copolymer dispersion (B) which has been obtained by copolymerisation of 40 to 55% of acrylonitrile with 20 to 45% of an aliphatic 1,3-diolefine of from 4 to 6 carbon atoms such as butadiene, 5 to 20% of styrene or an ester of methacrylic acid and an aliphatic saturated alcohol of from 1 to 4 carbon atoms and 1 to 7% of methacrylic acid. The two copolymer dispersions are in this case generally blended with one another in the ratio 2:1 to 1:2, advantageously in the ratio 1:1.

The two copolymer dispersions to be considered for the present process can be prepared separately from one another by emulsion polymerisation of the monomers in the presence of 0.1 to 5% of an emulsifier and also 0.01 to 2% of a radical-forming catalyst.

For the case of the production of the acrylonitrile copolymer dispersions (A), any suitable anionic emulsifiers can be used, such as alkyl sulphonates, alkylaryl sulphonates and fatty acid esters, non-ionic emulsifiers such as ethylene oxide derivatives of fatty acids, and in certain circumstances also cationic emulsifiers, such as quaternary ammonium salts.

In the case of the preparation of the polymer (B) containing carbon to carbon double bonds which can be cross-linked, more especially anionic emulsifiers, as mentioned above, are to be considered. As regards the copolymerisation of a comonomer carrying carboxyl groups, polymerisation is effected in the acid pH-range. Emulsifiers are to be considered which are stable in the acid range, such as the sulphates and sulphonates of long-chain fatty alcohols or non-ionic emulsifiers, such as reaction products of ethylene oxide (5–50 mols) with phenol (1 mol), for example oxethylated nonyl phenols, oxethylated diphenyl, as well as the reaction products of ethylene oxide with fatty alcohols, such as decyl alcohol, oleyl alcohol and others.

Peroxy compounds, possibly in the form of redox systems, are to be considered as initiators for the polymerisation and the following are to be mentioned as examples: alkali metal or ammonium persulphate, hydrogen peroxide, alkali metal or ammonium perborates, percarbonates and perphosphates. When redox systems are used, it is possible to consider as reducing agents, both sulphur compounds of the low valency stage of sulphur which operate in acid medium, such as sulphur dioxide, the alkali metal or ammonium pyrosulphites, bisulphites and also alkali metal thiosulphates, and, depending on the special polymerisation conditions, also reducing agents working in neutral or alkali medium, such as alkali metal formaldehyde sulphoxylates, formamidine-sulphinic acid or triethanolamine, diethylene triamine and triethylene tetramine. It is of course also possible to use these redox systems in the presence of complex formers, such as pyrophosphates or those of the type of ethylene diamine tetraacetic acid.

The quantity of the electrolyte remaining in the film after the stoving can be considerably reduced by ammonium or amine salts or other compounds which decompose under heat being used in the emulsifiers and also in the initiator systems. It is additionally also possible for the dispersions to be substantially freed from disturbing quantities of electrolyte by subjecting them to a dialysis or a treatment with ion exchangers.

A preferred method of preparation the copolymer dispersions therefore consists in employing ammonium persulphate as polymerization initiator and polymerizing at temperatures between 60 and 85° C.

Depending on the initiator system being used, the polymer or copolymer dispersions are prepared in the usual way at temperatures between approximately 25 and 100° C., it being generally preferred to work at temperatures between 60 and 85° C. Where a polymer or copolymer emulsion with hydrophilic groups is being prepared, the pH-value of the aqueous polymerisation medium can be between approximately 2 and 11, but as regards the copolymerisation of a monomer with hydrophilic groups, more especially carboxyl groups, the pH-value is preferably within 2 and 6.

The aqueous polymer dispersions, after completion of the polymerisation, are generally adjusted to a pH-value of 8 or higher in order to produce a sufficient storability. For neutralisation purposes, there are preferably used predominantly volatile bases, such as ammonia, morpholine, mono-, di-, or trimethyl-, ethyl- or -propyl amine, monoethanolamine, diethanolamine, or triethanolamine, etc.

In order to manage with as little emulsifier as possible and in order to be able easily to dissipate the heat of reaction in suitable manner, the polymerisation is generally carried out continuously or semi-continuously, in such a way that the monomers and the catalyst solution, possibly together with the emulsifier, being allowed to flow continuously at the reaction temperature into the reaction vessel.

The polymer or copolymer dispersions obtained by methods previously described are preferably produced in such a way that 30 to 45% polymer dispersions are obtained.

The two dispersions have particularly good compatibility with one another if the dispersion of the copolymer containing a conjugated diolefine incorporated therein by polymerisation contains a large proportion of copolymerised acrylonitrile, but this quantity should not exceed a proportion of 55%.

Already a small proportion of dispersion containing a 1,3-diene-hydrocarbon incorporated by polymerisation facilitates to an extraordinary degree the film formation from the dispersion of the acrylonitrile copolymer. In certain circumstances, it is already possible to work with an admixture of about 5% (based on solid content) of such a copolymer dispersion containing a conjugated diolefine incorporated by polymerisation in an amount near the upper limit of the diolefine content given above. The mixing ratio of the two copolymer dispersions can per se be between 5:95 and 95:5, although in most cases the mixing ratio of 1:1 is not substantially exceeded (on the part of the component containing the diolefine incorporated by polymerisation).

According to another modification of the present invention, it is possible first of all to complete the emulsion polymerisation of one of the copolymers and to carry out the production of the second copolymer emulsion in the presence of the already polymerised first emulsion. By using this procedure, it is possible in certain cases substantially to vary the properties of the dispersions which are obtained.

It is also possible for vulcanising and hardening agents or cross-linking agents, such as sulphur or compounds splitting off sulphur, to be added to the dispersions at the time of production or even later.

The cross-linking reaction of the diene polymer can also be promoted in a manner known per se by additions to the mixture of the dispersions of small proportions of organic bases, more especially heterocyclic bases, vulcanising agents and peroxidic cross-linking agents.

Other additives known per se, such as age registers, plasticisers, extenders and pigments, can be added to the copolymer dispersion mixtures to be used in accordance with the process of the invention, but more especially also the formaldehyde condensation resins of phenols, urea, melamine and their derivatives, which resins are very compatible with these copolymer dispersions. The latter resins contribute substantially to the improvement of the thermal properties of the coating in a manner known per se, since they enter into cross-linking reactions during the stoving process with the reactive groups of the polymer, more especially with the acid amide group. As well as these cross-linking reactions being promoted by the aforementioned crosslinking agents for the diene-polymer, they can also be promoted by polyvalent, polymerisable, compounds which are soluble in or can be dispersed in water, such as triallyl cyanurate, triacryl formal, etc. The said formaldehyde condensation products are advantageously used in the neutral or weakly alkaline pH-range in the form of the initial condensates which are soluble in water or which can at least be easily dispersed in water. Another possibility for varying the properties of the coatings which can be produced according to the present invention consists in adding polyfunctional compounds such as polysiocyanates, polycarbodiimides or polyepoxides to the copolymer dispersions, the stability of the dispersions generally not suffering in any way and no undesired secondary effects being observed.

With a dispersion of an acrylonitrile copolymer alone, it is generally not possible to obtain a satisfactorily flowing film with a higher content of acrylonitrile without adding a swelling agent, such as dimethyl formamide, tetramethylene sulphone, dimethyl sulphone, ethylene carbonate, dimethyl acetamide and others in an amount up to 30% based on polymer. With the mixture which has been described, on the contrary, such an addition is proved to be superfluous, for example for the production of insulations on electric wires, even although such an addition is not to be excluded with suitable mixing ratios for improving the workabilty.

The mixture of two polymer dispersions according to the invention, possibly after adding the aforementioned additives, produces a smooth and extendable coating after the stoving, this coating being surprisingly far superior in many of its properties to a coating obtained from each of the two individual constituents of the mixture.

The coatings can be applied in known manner to any material which has sufficient temperature resistance, such as metal, ceramic material, fibres and the like, with or without previous priming, and are applied for example by dipping, brushing, spraying etc. The temperature of the thermal after-treatment is generally above 100° C., possibly at 120 to 180° C. when using a drying chamber. In most of these cases heating periods of between 1 and 30 minutes are sufficient. The insulation of electrical conductors can be carried out by the methods usual for this purpose on wire-lacquering machines, the stoving conditions, such as temperature and withdrawal speed, depending on the design of the machine. Under starting conditions of wire-lacquering machines the stoving temperatures may vary within the range of 250° C., preferably 300° C. up to 400° C., depending on the withdrawal speed. Normally the latter corresponds to a time of stay of the wire in the starting shaft between 5 seconds and 1 minute.

The lacquered wires thus obtained have a high softening tempreature and an excellent film hardness, even after treatment in solvents (DIN 46453). In addition, the abrasion resistance of a film of the mixture of the said polymer dispersions is substantially higher than that which is measured with a film of each of the two individual components.

The parts mentioned in the following examples are parts by weight, unless otherwise indicated.

*Example 1*

(a) 0.5 part of lauryl sulphate is heated in 130 parts of water to 80 to 85° C. in a stirrer-type vessel with a reflux condenser. 8 parts of a 1% aqueous solution of ammonium persulphate are added and, within 4 to 5 hours, a mixture of 65 parts of acrylonitrile, 30 parts of styrene and 4 parts of methacrylic acid in the ratio by volume of 2:1 with a solution of 5 parts of methacrylamide in 53 parts of water, is run in at such a rate that a gentle reflux in the condenser is constantly maintained. The reaction is thereafter allowed to proceed for another 2 hours at the indicated temperature. Throughout the reaction period, 1.5 parts of 1% ammonium persulphate solution are added at regular intervals, for example 8 times. After completing the reaction, a pH-value of 7 is adjusted with dilute $NH_3$-solution and residual unreacted monomers are distilled off. Finally, small amounts of precipitates are filtered off after the pH-value has been raised to 8.5 with dilute $NH_3$-solution. A liquid 36–40% latex is obtained with complete reaction of the monomers. In the foregoing described copolymer latex said 4 parts of methacrylic acid as well as said 5 parts of methacryl amide may be substituted by the same amounts of acrylic acid resp. acrylic acid amide without any disadvantage.

(b) For the production of a polymer dispersion which effects crosslinking under heat, a solution of 1.5 parts of lauryl sulphate in 220 parts of water is heated in a pressure-tight vessel to 65° C. and a solution of 0.5 part of potassium persulphate in 30 parts of water is added. Using a measuring vessel, a monomer mixture is introduced under pressure in 4 to 5 portions, depending on the consumption which can be recognized from the rise in temperature, and within 4 to 6 hours, the said mixture consisting of 35 parts of butadiene, 50 parts of acrylonitrile, 10 parts of styrene and 5 parts of methacrylic acid. The polymerisation is completed about 2 hours after the last addition and the substantially 25 to 30% latex which is formed is neutralised in the manner indicated above.

The two latices are mixed with one another in the ratio 1:1 and 15%, based on the polymer, of a water-soluble phenol-formaldehyde concentration resin in the form of its 20% aqueous solution, is added. Using this mixture, a copper wire with a thickness of 0.7 mm. was lacquered in the usual way and stoved in a drying shaft with a length of for example 2 metres at a temperature of 380° C. and with a speed of travel of the wire of about 8 to 9 per minute. The lacquer coating is distinguished by a particularly smooth and uniform flow. With an increase in diameter of about 50µ, testing of the wire in accordance with DIN 46453 provides a pencil hardness of 6H and, after a treatment with alcohol, a pencil hardness of 2H. The softening test carried out in accordance with the said standard gives on average, without substantial fluctuations, values of about 300° C.

If the wire is initially stretched by 20% and then wound around a mandrel of the same diameter, the lacquer film does not show any cracks or broken areas, even if the tested sample is subjected to a heat shock treatment at 130° C. for 60 minutes. The test for abrasion resistance carried out with the NEMA-apparatus in accordance with the U.S. standard provides 90–120 rubbings.

With a mixing ratio of the two latices of 250 to 150 parts by volume, a somewhat higher pencil hardness is obtained with the same good test results, this hardness being about 7H and being 3 to 4H after treatment in the alcohol.

On the other hand, if the butadiene polymer is omitted, the resistance to heat and pressure (softening test) reaches values which are in the region of 200° C. the pencil hardness is 5H and about 1H after the alcohol treatment. At the same time, the resistance to abrasion is considerably less satisfactory. The flow on the wire surface is only then equally good if the latex has added thereto 5 to 10 parts, based on the solid content, of a solvent such as dimethyl formamide.

*Example 2*

In the same way as in Example 1, the same polymer dispersions are used for the insulation of electrical conductors, but the acrylonitrile copolymer does not contain any methacrylamide. In admixture with the butadiene copolymer, an equally excellent flow of the lacquer on the wire surface is obtained, with generally an equally good level of the test values, and only the resistance to heat and pressure is lower and is in the region of 250° C. On the other hand, if the coating is carried out without using the butadiene copolymer, the number of rubbings falls to 40 to 75, and the resistance to heat and pressure falls to about 150 to 180° C.

*Example 3*

(a) A solution of 1 part of lauryl sulphate in 125 parts of water is heated in a stirrer-type vessel to 80° C. 15 parts of a 2% aqueous ammonium persulphate solution are added and 65 parts of acrylonitrile, in which 30 parts of methacrylic acid dibutyl amide are dissolved, are simultaneously introduced in a constant ratio with a solution of 4 parts of methacrylic acid and 5 parts of methacrylic acid amide in 50 parts of water over a period of 5 hours. The speed is so regulated that always after adding a certain quantity, there is a pause until the polymerisation has proceeded to such a degree that the reflux in the condenser ceases again. During the polymerisation and the final heating period of 5 hours, 10 parts of 2% ammonium persulphate solution are added in portions. After removing the residual monomers, a 38% latex is obtained, the pH-value of which is adjusted to 8.5 with dilute ammonia solution.

(b) It is mixed in the ratio by volume of 1:1 with a 25% latex which have been obtained from 50 parts of acrylonitrile, 20 parts of methyl methacrylate, 30 parts of butadiene and 5 parts of methacrylic acid with the aid of 0.6 part of lauryl sulphate at 30° C. with activation by 0.6 part of persulphate and 0.6 part of sodium pyrosulphite.

The mixture of the two latices, after adding 10%, based on solid content, of a phenol-formaldehyde condensation product in the form of an aqueous 20% solution, is tested as a wire lacquer in accordance with Example 1. With an increase in diameter of on average 40 to 55µ, a lacquer layer is obtained which shows a good flowing surface and satisfactory convolutions, a pencil hardness of 6H and, after alcohol treatment, a pencil hardness of 3H. The number of rubbings is 80 to 100 and the thermal compressive strength is at a temperature of 270 to 280° C.

If the latex of the butadiene copolymer is not admixed, and with an addition of 15% of dimethyl formamide, based on solid content of the latex, with the acrylonitrile copolymer alone, it is true that a smoothly flowing insulating layer can also be produced on the copper wire. However, if the wire surface is observed under a microscope, it shows hair cracks and the convolutions are unsatisfactory under all experimental conditions.

The latex of the butadiene copolymer as such, with admixture of 20 to 30 parts of the water-soluble phenol-formaldehyde resin, produces a lacquer coating which only has the pencil hardness of 3H and, after treatment with alcohol, a pencil hardness of 3B to 5B. The number of rubbings in this case is 20 to 40 and the resistance to heat and pressure is between 150 and 170° C.

*Example 4*

A solution of 1 part of lauryl sulphate in 130 parts of water is heated while stirring to 85° C. and 6.7 parts of a 2% aqueous ammonium persulphate solution are added thereto. Thereafter, in a constant ratio, a mixture of 65 parts by weight of acrylonitrile and 30 parts of styrene, together with an aqueous solution with 5 parts of methacrylamide and 5 parts of the methacrylamide compound of p-aminobenzoic acid, neutralised with dilute ammonia and in 50 parts of water, is run-in within 4 hours. Ammonium persulphate is added in a total quantity of 0.25 part and in portions during the polymerisation and the final heating period of 2 hours. The prepared latex is adjusted to a pH-value of 8.5. The solid content is in the region of 38%. Next in the ratio by volume of 1:1 with the latex of a copolymer of butadiene, styrene, acrylonitrile and methacrylic acid as described in Example 1, and pigmented with titanium oxide, it produces with a good flow of the lacquer surface on metal sheets and after the stoving in the drying chamber for 30 minutes at 160°, a film of excellent elasticity which has good adhering properties and is particularly resistant to scratching.

We claim:
1. An aqueous latex coating composition comprising a mixture of
   (A) an aqeous dispersion of a coplymer of
      (a) 55 to 65 percent of acrylonitrile
      (b) 25 to 35 percent of styrene
      (c) 1 to 7 percent of a member selected from the group consisting of acrylamide and methacrylamide,
      (d) 1 to 7 percent of a member selected from the group consisting of acrylic acid and methacrylic acid, and
   (B) an aqueous dispersion of a copolymer of
      (a) 20 to 45 percent of an aliphatic conjugated diolefine of from 4 to 6 carbon atoms
      (b) 40 to 60 percent of acrylonitrile
      (c) 5 to 20 percent of a member selected from the group consisting of styrene and an ester of methacrylic acid with an aliphatic saturated alcohol of from 1 to 4 carbon atoms, and
      (d) 1 to 7 percent of methacrylic acid; said latices A and B being mixed in a ratio which corresponds to a ratio of solid polymer A to solid polymer B between 2:1 and 1:2.

2. The aqueous latex coating composition of claim 1 wherein said aliphatic conjugated diolefine of from 4 to 6 carbon atoms is butadiene.

3. The aqueous latex coating composition of claim 1 wherein said copolymers A and B are prepared by copolymerizing the said monomers in the presence of ammonium-persulfate as polymerization initiator in an amount of from 0.1 to 2% by weight, based on monomers to be polymerized.

4. A method which comprises applying to a solid surface a thin layer of the aqueous latex coating composition of claim 1, and heating that layer to temperatures in the range from 120° C. to 400° C. for at least 5 seconds.

5. A method which comprises applying to a solid surface a thin layer of the aqueous latex coating composition of claim 1, and heating that layer to temperatures in the range from 300° C. to 400° C. for 5 seconds up to 1 minute.

6. A method of applying an adherent lacquer coating to a metal wire which comprises applying thereto a thin layer of the aqueous latex coating composition of claim 1, and heating said layer to a temperature of 300–400° C. for a time of from 5 seconds to 1 minute.

7. The process of claim 6 wherein said latex coating composition further contains a phenol formaldehyde resin and the mixture is applied to a copper wire at a speed of up to 10 meters per minute.

References Cited by the Examiner
UNITED STATES PATENTS

| | | | |
|---|---|---|---|
| 2,614,093 | 10/52 | Wheelock | 260—892 |
| 2,626,248 | 1/53 | Brown | 260—82.1 |

OTHER REFERENCES

Schildknecht, Polymer Processes, vol. 10 of High Polymers (1956), Interscience publishers, Inc., New York, N.Y. pages 665–667.

MURRAY TILLMAN, *Primary Examiner.*

LEON J. BERCOVITZ, *Examiner.*

UNITED STATES PATENT OFFICE
CERTIFICATE OF CORRECTION

Patent No. 3,192,176                                      June 29, 1965

Karl-Heinz Mielke et al.

It is hereby certified that error appears in the above numbered patent requiring correction and that the said Letters Patent should read as corrected below.

Column 3, line 38, for "-CO-NM-$CH_2$-O-$CH_3$ group." read -- -CO-NH-$CH_2$-O-$CH_3$ group. --; line 51, for "55%" read -- 60% --; column 5, line 34, for "registers" read -- resisters --.

Signed and sealed this 22nd day of February 1966.

(SEAL)
Attest:

ERNEST W. SWIDER                                  EDWARD J. BRENNER
Attesting Officer                                       Commissioner of Patents